(12) United States Patent
Auberger et al.

(10) Patent No.: US 8,134,603 B2
(45) Date of Patent: Mar. 13, 2012

(54) METHOD AND SYSTEM FOR DIGITAL IMAGE STABILIZATION

(75) Inventors: Stephane Auberger, Noisy-le-Grand (FR); Carolina Miro, Saint Cloud (FR); Yann Picard, Caen (FR)

(73) Assignee: NXP B.V., Eindhoven (NL)

( * ) Notice: Subject to any disclaimer, the term of this patent is extended or adjusted under 35 U.S.C. 154(b) by 359 days.

(21) Appl. No.: 12/063,677

(22) PCT Filed: Aug. 10, 2006

(86) PCT No.: PCT/IB2006/052760
§ 371 (c)(1),
(2), (4) Date: Jun. 22, 2010

(87) PCT Pub. No.: WO2007/020569
PCT Pub. Date: Feb. 22, 2007

(65) Prior Publication Data
US 2010/0253793 A1    Oct. 7, 2010

(30) Foreign Application Priority Data
Aug. 12, 2005   (EP) .................................... 05300664

(51) Int. Cl.
*H04N 5/228* (2006.01)
*G06K 9/32* (2006.01)
(52) U.S. Cl. ...................... 348/208.3; 382/295; 382/296
(58) Field of Classification Search ............... 348/208.3, 348/208.6, 497
See application file for complete search history.

(56) References Cited

U.S. PATENT DOCUMENTS

| | | | | |
|---|---|---|---|---|
| 5,969,766 A * | 10/1999 | Kim | .......................... | 375/240.14 |
| 6,169,766 B1 * | 1/2001 | Aoki et al. | ................ | 375/240.16 |
| 6,628,711 B1 * | 9/2003 | Mathew et al. | .......... | 375/240.12 |
| 6,927,804 B2 * | 8/2005 | Adams et al. | ................. | 348/624 |
| 7,548,256 B2 * | 6/2009 | Pilu | ............................ | 348/208.3 |
| 7,755,667 B2 * | 7/2010 | Rabbani et al. | ............ | 348/208.6 |
| 2004/0052431 A1 * | 3/2004 | Locker et al. | ................. | 382/296 |
| 2007/0002146 A1 * | 1/2007 | Tico et al. | .................. | 348/208.1 |

FOREIGN PATENT DOCUMENTS

| | | |
|---|---|---|
| CN | 1571475 A | 1/2005 |
| EP | 0632649 A1 | 1/1995 |

(Continued)

OTHER PUBLICATIONS

McReynolds, D; et al "Stabilization of Infra-Red Aerial Image Sequences Using Robust Estimation" Proceedings of the Conference Vision Interface, May 19-21, 1999, pp. 288-295.

(Continued)

*Primary Examiner* — Albert Cutler

(57) ABSTRACT

The present invention relates to a method and system for a digital image stabilization intended to remove unwanted camera movement or jitter, both translational and rotational jitter. The system comprises the following means: 1) a motion estimation stage (10) of the global motion of the camera: block motion vectors are calculated for specific parts of the image and global motion parameters representing the camera motion are then derived. 2) a motion/jitter filtering stage (11): the translation vector and the rotation angle are filtered separately, a boundary check being then performed for verifying if the correction thus done is not above an allowed threshold. 3) a jitter compensation stage (12): the raw sequence is compensated according to the extracted jitter and the result is a stabilized sequence.

13 Claims, 3 Drawing Sheets

FOREIGN PATENT DOCUMENTS

| EP | 1117251 A1 | 7/2001 |
| WO | 2005064919 A1 | 7/2005 |

OTHER PUBLICATIONS

Ko, S-J; et al "Fast Digital Image Stabilizer Based on Gray-Coded Bit-Plane Matching" IEEE Transactions on Consumer Electronics, vol. 45, No. 3, Aug. 1999, pp. 598-603.

Erturk, S. "Image Sequence Stabilization: Motion Vector Integration (MVI) Versus Frame Position Smoothing (FPS)" Proceedings of the 2nd International Symposium on Image and Signal Processing and Analysis 2001, pp. 266-271.

Nguyen-Phuc, Q-L; et al "An MPEG-4 Renderer for High Quality Video Composition and Texture Mapping" Journal of VLSI Signal Processing, Mar. 2003, vol. 33 (3), pp. 255-265.

* cited by examiner

METHOD AND SYSTEM FOR DIGITAL IMAGE STABILIZATION

FIELD OF THE INVENTION

The present invention relates to a method for digital image stabilization for removing unwanted camera movements, in translation and/or rotation, called jitter, from a raw sequence of images generated by said camera and obtaining a stabilized sequence of images. Such a method may be used, for example, in systems such as digital low/mid-end movie cameras or mobile phones. The invention also relates to a corresponding system for carrying out said stabilization method.

BACKGROUND OF THE INVENTION

As well known, the goal of digital image stabilization methods (with an aim of simplification, the methods of digital image stabilization will be called hereafter "DIS") is to remove unwanted camera movement or jitter, thus providing a more pleasant viewing experience, to produce a sequence that displays requisite camera movement only. Jitter is defined as all the undesired positional fluctuation of the image that is added to the intentional motion of the camera, in particular translation and/or rotation. In most prior art DIS systems, a motion estimation is performed between two successive frames (at times called respectively t and t−1) to get the global motion of the image frame which is represented by a single vector called the "Global Motion Vector" (hereafter "GMV"). Therefore, this motion represents only the translational Motion between the successive frames, and the jitter correction applied consequently only corrects the translational jitter Such correction is not sufficient. As a matter of facts, jitter is often also of rotational nature, either purely rotational or mixed with a translational jitter component. Indeed, once the translational jitter has been removed, the rotational residual component becomes all the more apparent.

Furthermore, most prior art systems, supporting both rotational and translational correction, are complex and expensive. As an example of such methods, among others, one can quote the following ones: the paper by Mc Reynolds et al.: "Stabilization of infra-red aerial image sequences using robust estimation.", published in "Proceedings of the Conference Vision Interface 1999".

SUMMARY OF THE INVENTION

Accordingly, it is an object of the invention to provide a method that would remove both translational and rotational jitter, at low-cost and easy to implement into a mobile device.

To this end, the method according to the invention comprises the following three main steps:
  a first step of estimation of global motion of said movie camera, comprising sub-steps of calculating block motion vectors for predetermined parts of said images (Img), determining macro-blocks for each of said parts and matching said macro-blocks of a current image with the ones of a previous image, and deriving from said block motion vectors of a translation vector and a rotation angle vector representing the motion of said camera;
  a second step of filtering and extracting said jitter by separating intentional motion from the unintentional one, comprising the sub-steps of translation vector filtering and rotational angle filtering; and
  a third step of jitter compensation, consisting in compensating said raw sequence of images according to said extracted jitter, in order to obtain said stabilized sequence of images.

The method according to the invention detect and remove translational and rotational jitter and that at low-cost. Furthermore, the method is easy to implement.

Some elementary steps of the method are known per se. They have been disclosed in publications, patents or patent applications. For example, the usage of binary motion estimation is disclosed in "Fast Digital Stabilizer Based on Gray-Coded Bit-Plane Matching", by S-J Ko and al, published in "IEEE transactions on Consumer Electronics", vol. 45, n° 3, pp. 598-603, August 1999. The usage of a least mean square solution applied on block motion vectors is disclosed in "Video Stabilization Algorithm Using a Block-based Parametric Motion Model", by Chen, Stanford University, USA, "EE392J Project Report, Winter, filtering method". A filtering method for the translational jitter is taught in the international patent application (Stephane Auberger et al.), entitled "Method and system for stabilizing video data". A similar method is also described in the article by S. Erttirk: "Image sequence stabilisation: Motion vector integration (MVI) versus frame position smoothing (FPS),", published in the Proceedings of the 2nd International Symposium on Image and Signal Processing and Analysis 2001, pp. 266-271.

However, the method according to the invention comprises, in particular, the following specific steps and characteristics:
  using of a binary texture indicator for performing a block motion search;
  speeding and improvement of the motion search by using a "Sum of Absolute Difference" ("SAD") threshold mechanism;
  complete pruning of the BMVs before a system resolution;
  applying a rejection criteria to the system resolution results; and (Rotation+Translation) filtering and bounding check steps.

In some circumstances, the stabilization method in accordance with the invention cannot be applied as such. For example, if the method is capable of handling memory requirements to stabilize formats such as sequence of data exhibiting the so-called "CIF-format", but cannot perform it because there is too much processing otherwise going on the device or because the battery level is too low, the method must be adapted to continue to be used.

In accordance with a further embodiment, in such a case, the original sequence of data is then first down-sampled by a predetermined factor k, during a first supplementary step. Then the down-sampled sequence is fed to a circuit executing the stages of the method of stabilization according to the main embodiment of the invention, which provides a correction translation vector and a correction rotation angle. Only the correction translation vector coordinates are multiplied with the same factor as the one used during the down-sampling step. The original wide format sequence is thus compensated.

In accordance with this further embodiment, a smaller amount of data is processed by the circuits implementing the method of stabilization, which renders the method possible even if the computer resources are low.

The invention also relates to a system allowing to carry out this stabilization method.

To this end, the system comprises:
  means for estimating the global motion of said movie camera, said means themselves comprising means for calculating block motion vectors for predetermined parts of said images (Img), means for determining macro-blocks for each of said parts and matching said macro-blocks of a current image with the ones of a previous image, and means for derivating from said block motion vectors a translation vector and a rotation angle vector representing the motion of said camera;

means for filtering and extracting said jitter by separating intentional motion from the unintentional one, said means themselves comprising means for filtering translation vector and rotational angle; and means for compensation of said raw sequence of images according to said extracted jitter, in order to obtain said stabilized sequence of images.

BRIEF DESCRIPTION OF THE DRAWINGS

Additional objects, features and advantages of the invention will become apparent upon reading the following detailed description and upon reference to the accompanying drawings in which.

DETAILED DESCRIPTION OF THE INVENTION

In the following description, well-known functions or constructions by the person skilled in the art are not described in detail since they would obscure the invention in unnecessary detail.

Figure 1:
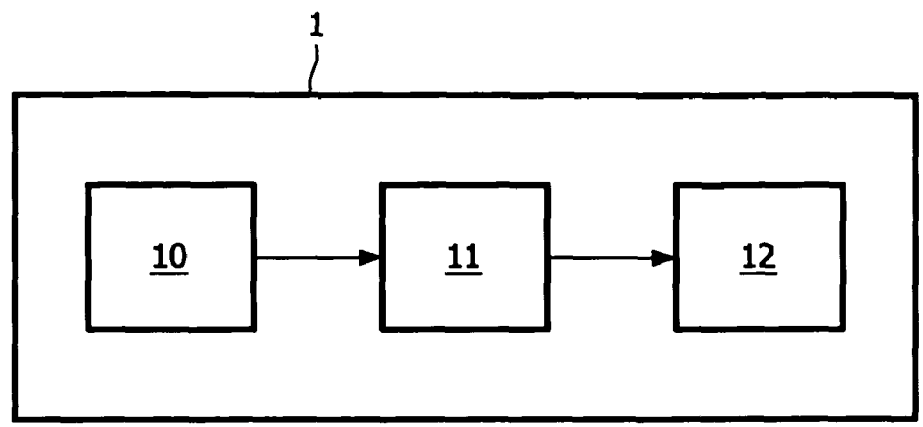
FIG. 1 schematically illustrates the architecture of a system implementing the method of digital image stabilization according to a preferred embodiment of the invention.

FIG. 1 schematically illustrates the architecture of a system 1 implementing the method of digital image stabilization (DIS) according to the invention. Such a system comprises three main blocks corresponding to the three main stages of the method, i.e. a motion estimation stage 10, a motion/jitter filtering stage 11 and a jitter compensation stage 12.

In the first block 10, an estimation of the global motion of the camera is carried out. In the second block 11, the jitter is extracted and separated from intentional motion (like panning, etc.). In the third block 12, the raw sequence of data is compensated according to the extracted jitter and the result (output of block 12) is a stabilized sequence. These three main stages of the DIS method according to the invention now will be described in a detailed way.

The first stage 10, i.e. the motion estimation part, is subdivided into three sub-stages:

Calculation and generation of so-called "Block Motion Vectors" (hereafter "BMVs") for specific parts of an image (corners, areas etc.) provided by a camera, said BMVs matching macroblocks between the current and the previous image;

Pruning of the BMVs for affine motion search; and

Resolution of a system of equations and determination of rejection criteria in order to obtain the global motion parameters (translation vector and rotation angle), representing the camera motion, derived from the BMVs.

The first sub-stage of BMVs generation comprises the following steps:

The first step concerns the generation of a binary image. "1 bit images" are used for motion estimation, because it considerably lowers the memory constraints, and moreover, the distortion function between reference and search blocks can be computed very efficiently. The distortion function, the "Sum of Absolute Differences" (hereafter "SAD") is calculated by using "XOR" operations that can be easily implemented. A "Gray-coded bit planes" decomposition of the image is used. Gray-coded bit planes are created as follows:

Let the luminance of the pixel at a location be represented as:

$$F_{lum}(x,y) = a_{N-1} 2^{N-1} + a_{N-2} 2^{N-2} + \ldots + a_k 2^k + \ldots + a_1 2^1 + a_0 2^0 \quad (1);$$

where x and y are coordinates of said plane and $a_k$, $0 \leq k \leq N-1$, is either 0 or 1. For example, to fix the ideas, in this case N=8 as 8 bit luminance images are used.

The $4^{th}$ Gray bit code $g_4$ is computed from the following equation:

$$g_4 = a_4 \oplus a_5 \quad (1bis);$$

where the symbol $\oplus$ represents the "eXclusive OR" operation and $a_k$ is the k-th bit of the "base 2" representation given by equation (1). The $4^{th}$ Gray-coded bit plane image, or binary image, corresponding to the originally generated image by the camera is recorded into memory means.

Figure 2:
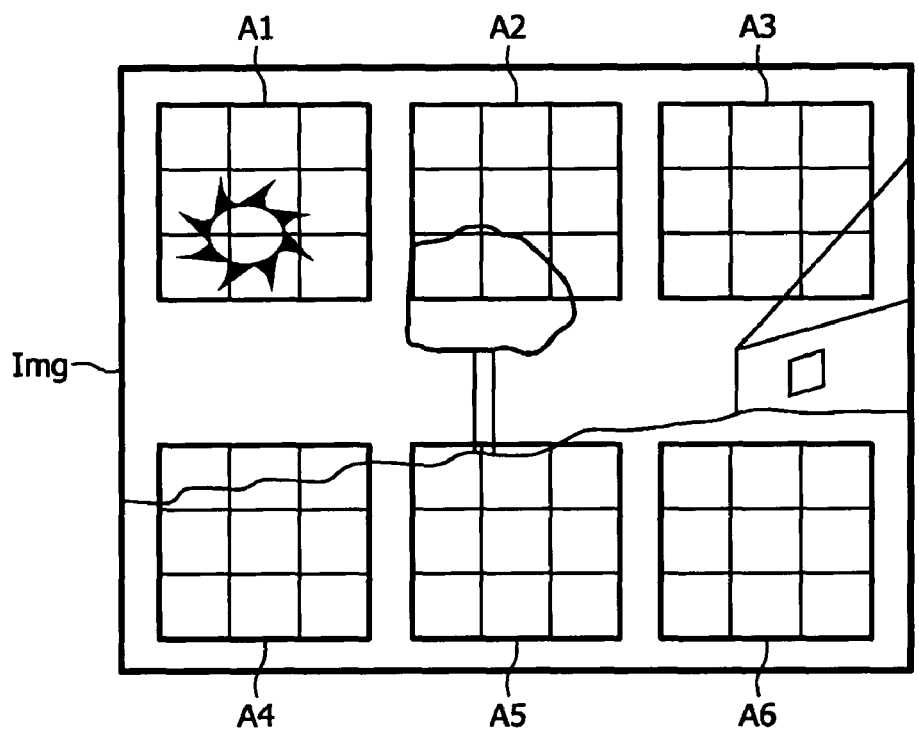
FIG. 2 illustrates an example of six motion search areas applied to a binary image.

The second step relates to block location and to a texture indicator. Said binary image 1 mg, for example representing a landscape, is divided into six areas, A1 to A6, regularly distributed according to two parallel lines as shown by FIG. 2, on top and bottom of the image respectively. Each area, A1 to A6, contains nine macroblocks (hereafter "MB") of 16×16 pixels (in the case of the format of image known as QCIF format of image).

Along with the binarization of the 8-bit image, a reliability measure is computed for each binary MB of the 1-bit image. Said measure is performed by simply counting the number of '1' pixels in the 16*16 pixels blocks. MBs that are too low textured, i.e. having too much or too little ratio of '1's compared to '0's, are labeled as unreliable and no motion estimation is performed on them. For example, some blocks are very homogenous and these blocks very often lead to wrong estimated Motion Vectors.

The third step concerns the block matching search strategy. Said strategy comprises the following sub-steps:

There is a variable number of Block Motion Vectors (BMVs) in an area, on which a full search block matching is performed.

Predictor and search range: To further simplify the number of candidate vectors in each area, only the first vector of each MB line will have an extended search area. The remaining blocks will have a reduced search window, centered on a predictor motion vector taken from the preceding reliable BMV. If the chosen neighbor is unreliable, the last valid MV is used as predictor (given the processing order left to right, top to bottom).

Rejection of probably unreliable MVs: According to an important characteristic of the invention, a mechanism has been added for rejecting some probably unreliable Motion Vectors. Particularly in case of a light change, the motion search will produce a result, but this result may be completely wrong: the matched blocks are very different, and the resulting vector points more to the "less dissimilar block" than to the "most similar one". Therefore, it is chosen to reject MVs for which the SAD is above a certain threshold (here-after referenced as SAD_threshold).

Speed up the block-matching search: This threshold can also be used to speed up the Motion Search. Previously, the following mechanism was in place: for each MB search position, the current SAD was compared to the current minimum SAD every two lines in the MB. If it is already above it, the search, for this position, was stopped. Thus, by initializing current minimum SAD to the SAD_threshold, it becomes possible to further speed up the matching process.

The fourth step concerns sub-pixel motion estimation.

One way to perform a sub-pixel search is to interpolate the 8-bit image to create sub-pixel samples, and apply the binarisation process to this extended image. Then, the matching of binary extended images provides motion vectors with sub-pixel accuracy.

The second sub-stage of the first stage 10 consists in pruning the BMVs in order to perform an affine motion search.

From the previous step a set of BMVs has been obtained, that is a set of corresponding points between the current and previous images. To get the global affine motion parameters, this system is solved. With more than three pairs of corresponding points between two frames, the least square solution of the equation is obtainable, giving the global affine motion parameters. In order to get a reliable result, much more vectors are used (up to 54 vectors) thus creating an over-determined system.

However, the least-square algorithm is very sensitive to outliers, and removing them properly is a crucial step of the motion estimation process. This is done in three steps:

1. Removing more BMVs based on their SAD: Vectors whose SAD is above a certain threshold, hereafter SAD_threshold_low, are rejected (the threshold is of course lower than the one previously used in the "Motion Estimation").

2. Removing local outliers: the outliers are first removed locally for each area. There are six areas and up to nine vectors per area.

The process for one coordinate of the vector will be now explained, for example for x-coordinate. For each vector k (with $0 \leq k \leq$ number of valid vectors) in the area, the sum of the absolute differences sum_diff[k] is calculated from this vector to all the others (i) in the area, with:

$$\text{sum\_diff}[k] = \Sigma_i \text{abs}(\text{value}[k] - \text{value}[i]) \quad (2)$$

Then the following calculation is performed:

$$\text{average\_diff} = (\Sigma_k \text{sum\_diff}[k])/\text{number\_of\_valid\_vectors} \quad (2\text{bis});$$

where average_diff is the average of the sum of absolute differences over the area.

Finally, the rejection criteria sum_diff_[k] is as follows:

$$\text{sum\_diff\_}[k] > (\text{number\_of\_valid\_vectors}/a) + \beta * \text{average\_diff} \quad (2\text{ter}),$$

α and β being predetermined thresholds.

This calculation is done independently on the x and y vector values. If any of the vector coordinates verifies the equation (2ter), then said vector is rejected.

3. Removing global outliers: The outlier rejection process done at the image level, using all the motion vectors, uses the same principle as the local one. The local step is necessary because some vectors would be able to create clusters at the global step and, thus, should be removed, if possible at the local level first. The global rejection allows removing outliers that are still remaining after the first phase, because the area have a very low number of vectors or contains moving objects that does not cope with the global motion. Threshold values α and β are less restrictive however in order to avoid rejecting too many vectors in case of high rotational motion for example.

The third sub-stage of the first stage 10 concerns the resolution of a system of equations and the determination of rejection criteria.

The over-determined system is solved (the first degree simultaneous equation is solved by Gauss-Jordan method). The system is:

$$X = ax + by + e$$

$$Y = cx + dy + f,$$

x and y being coordinates of said binary images.

The least mean square solution gives the six parameters a, b, c, d, e and f. Modeling the transformation of said system of equations as Translation (translation vector (Tx, Ty))+Rotation (rotation angle θ)+Zoom of the camera (scaling factor r), these equations correspond to:

$$X = r \cos \theta x - r \sin \theta y + Tx$$

$$Y = r \sin \theta x + r \cos \theta y + Ty$$

Therefore, the rotational angle θ is calculated while checking the consistency of the parameters a, b, c and d as given by the system resolution:

A first check is carried out to determine if the following equation is approximately satisfied:

$$a^2 + b^2 = c^2 + d^2 \text{ (should both be equal to } r^2\text{), by rejecting results where } (a^2+b^2) - (c^2+d^2) > \text{max\_diff\_zoom\_factor} \quad (3);$$

max_diff_zoom_factor being a predetermined zoom parameter.

A second check is carried out to determine if the two equations produce approximately the same rotational angle, by rejecting results when:

$$|\theta_1 - \theta_2| > \text{max\_angle\_difference} \quad (4)$$

where max_angle_difference is a predetermined rotation angle parameter, $$\theta_1 = \arctan(-b/a) \text{ and } \theta_2 = \arctan(c/d)$$

Moreover, if a further predetermined rotation angle parameter, noted medium_angle_difference, matches the following equation:

$$\text{medium\_angle\_difference} < |\theta_1 - \theta_2| < \text{max\_angle\_difference} \quad (4\text{bis}),$$

the smallest of the rotation angle found is selected as a value of θ.

If the results are considered consistent, we thus obtain both a translation vector (Tx=c, Tx=f) and a rotational angle θ given by:

$$\theta = (\theta_1 + \theta_2)/2$$

If the system resolution fails because either one of the equation (3) or (4) is true, the rotational angle is put to 0. For the translation vector, the median of the BMVs is taken (after the outlier removal process).

The second stage 11 of the DIS method according to the invention consists in motion filtering.

The translation vector and the rotation angle are filtered separately. Once the ideal correction in translation and rotation are found, a boundary check is performed. Thus said second stage 11 comprises three main steps.

The first step consists in filtering the translation. Separating the intentional motion from jitter in a consistent way over the course of a sequence is a complex problem. The main constraint, for a real-time application, is that not any delay is allowed, meaning that some frames cannot be stored in memory means and that a motion is better known. The filtering method for the translation vector is known per se, as already recalled. Thus, it is not necessary to further detail such a method. The second step consists in filtering the rotation angle vector. The rotation angle is filtered in a different, simpler way because its variations are expected to be less erratic than the ones of the translation vector. The angles given by the motion estimation are accumulated over the sequence of images provided by the camera. The process tries to compensate them. Accumulated angles are calculated by summing all the rotation angles over the complete sequence, for example, at frame n:

$$(Acc\ \theta)[n] = \Sigma_{(1 \leq k \leq n)} \theta[k]$$

The original accumulated angle is defined as the sum of the original rotational angles (as given by the motion estimation process). The corrected accumulated angle is defined as the sum of the corrected accumulated angle (after clipping due to the bound checking step, as described hereafter)

Usually, because of the bound checking step, compensating the full rotation angle is not feasible, or even desirable, if the user decides to voluntarily tilt the camera. When going back to the initial position, the new angular "fixed" position (corresponding to the corrected accumulated angle) could be slightly tilted compared to the original sequence. To avoid this, the original accumulated angle, as measured by the motion estimation, is stored and kept into memory means. If, for a certain number of consecutive frames, the corrected accumulated angle is too far from the original accumulated one, an extra correction is added to bring the corrected sequence back to a position closer to what the user desires.

The third step consists in bound checking. During the "bound checking step" the "Rotation+Translation correction" (hereafter "R+T") is checked to determine if said correction is not above a predetermined allowed threshold, corresponding to an extra input area authorized. If so, "R+T" is further corrected to stay within the allowed range (for example, to fix the ideas, a border of ±8 pixels): the emphasis is put on the translation correction first (with a simulated extra area slightly smaller than the real one), then the rotational angle is clipped to stay within the allowed extra bounds of the image.

Figure 3A:
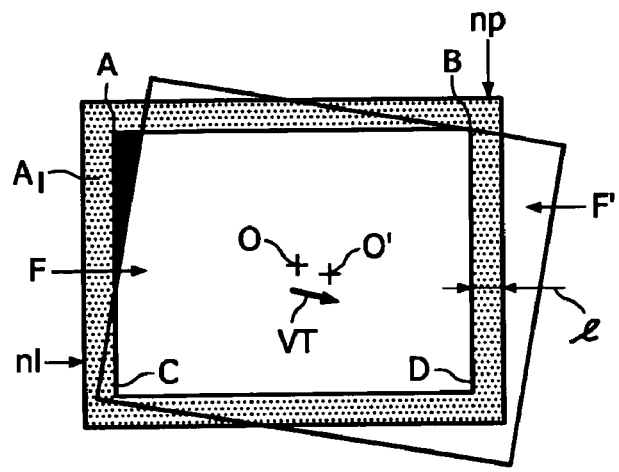
FIG. 3A to 3C illustrate steps of bound checking of an image.
Figure 3B:
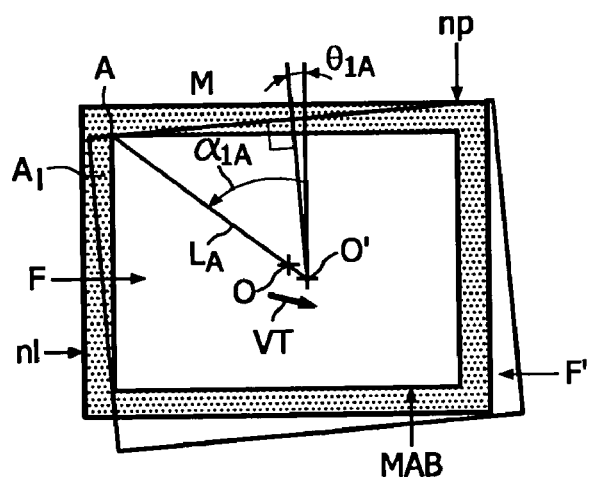
Figure 3C:
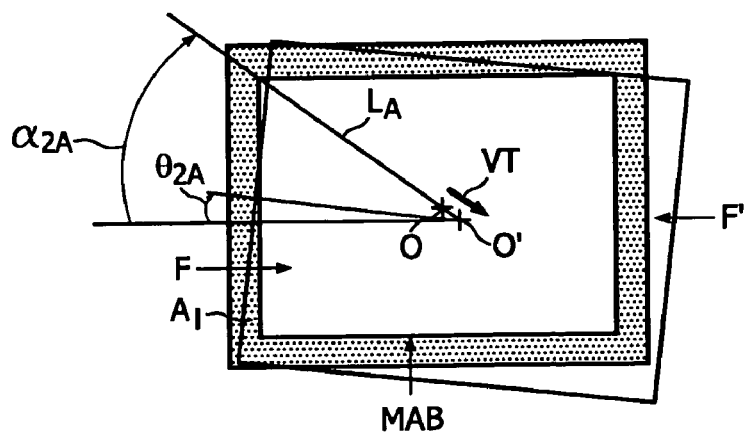

The detailed process is described hereafter with reference to FIG. 3A to 3C. In said figures, identical items are identified by the same signs of reference.

First, the image frame F (here-after "frame") is translated (center of the frame goes from O to O'): translation vector VT (Vx, Vy). Given the position of the new center O', the frame F can only be rotated (frame F=rotated frame) until a certain angle that has to be calculated. FIG. 3A illustrates the final frame creation process: the captor, for example the one of a camera (not shown), produces a frame F with an extra area input Ai (grayed area: border size equal to 1). As illustrated, if the rotation angle to create the stabilized frame F is too large, it should have a hole in the rotated frame (black area).The inner rectangle ABCD of the frame F delimits the image as shown to a user (i.e. the maximum allowed border MAB).

Now, it will be explained how the bound checking step works taking into consideration one of the corners of the cropped image (for example A, the top left one), but the process is identical for the other corners and has to be repeated for each of them. The goal is to calculate the limit angle for which the rotated image border intersects point A, taking into account the border size 1.

Going either clockwise or counter clockwise, there are two limit angles possible per considered corner. Any angle is comprised between these two limit angles and will not lead to the creation of a hole (considering the corner A: again, this has to be checked for the remaining corners).

FIG. 3B shows how the first limit angle $\theta1_A$ is calculated without generating a hole near the point A (first case) according to the equation:

$$\theta1_A = \alpha1_A - ArcCos((O'M)/L_A)$$

with $\alpha1_A = ArcCos((nl/2-1+vy))/L_A)$, $L_A$ being the distance between the displaced center O' and the corner A (easily calculable from the frame size, border size 1 and translation vector VT), Vy they value of vector VT and O'M=nl/2 (with np and nl being the captured frame F width and height, respectively).

Similarly, FIG. 3C shows how the other limit angle $\theta2_A$ is calculated without creating a hole near the point A (second case).

$$\theta2_A = \alpha2_A - ArcCos((O'N)/L_A)$$

with $\alpha2_A = ArcCos((np/2-1+vx))/L_A)$ and vx the x value of vector VT and O'N=np/2. Thus, going through the four corners A, B, C and D, eight angles are obtained. The minimum of the positive angles and the maximum of the negative angles are then calculated. The rotational angle as given by the motion estimation is clipped to one of these two final angles, if necessary.

The third and last stage 12 of the DIS method according to the invention consists in jitter compensation. The translation vector and the rotation angle derive the displacement of the top-left and top-right points of the image and these coordinates are fed to a renderer engine (not shown) capable to compensate the residual translation and rotation. Such an engine is well known per se and described, for example in the paper by Quynh-Lien Nguyen-Phuc and Carolina Miro Sorolla: "An MPEG-4 Renderer for High Quality Video Composition and Texture Mapping", published in "Journal of VLSI Signal Processing 33", 2003, pages 255-265. Thus, a description of the circuit is not useful.

However, as already recalled, it may occur, in some circumstances, that the stabilization method according to the invention cannot be applied as such. For example, if the method is capable of handling memory needs to stabilize formats such as so-called "CIF-format" sequence, but cannot perform it because there is too much processing otherwise going on the device or because the battery level is too low.

Figure 4:
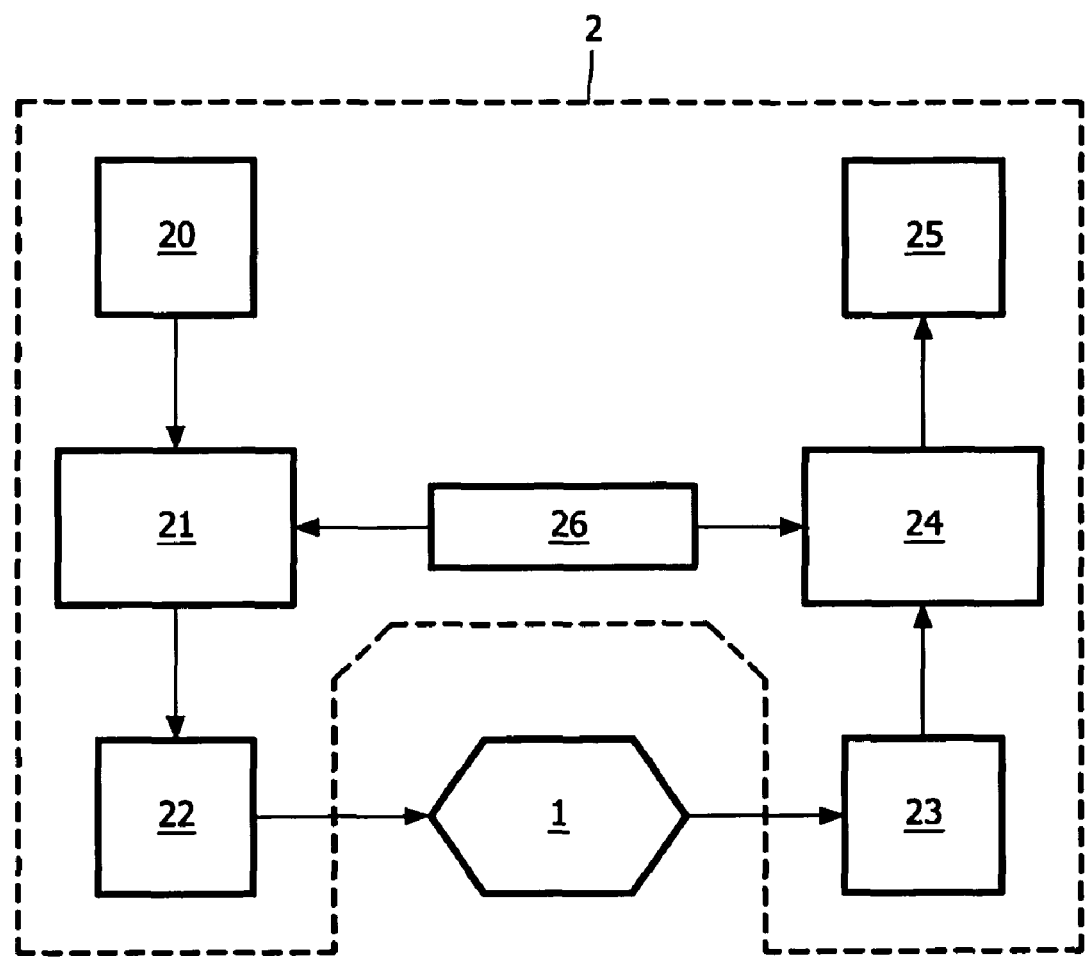
FIG. 4 schematically illustrates the architecture of a system implementing the method of digital image stabilization according to a further embodiment of the invention.

FIG. 4 then schematically illustrates a further embodiment 2 of digital image stabilization according to the invention.

The input sequence 20, for example data exhibiting a CIF format or even a VGA format, and called "original wide-format" sequence, is fed to a down-sampling circuit 21. To perform such a down-sampling step, it is possible to use a well-known bilinear interpolator. A predetermined down-sampling factor k, stored in a register 26 or the like, is applied to circuit 21. As a result, an "original small-format sequence" (about QCIF format) is obtained (22) and fed to the circuits of FIG. 1, i.e. the system 1 implementing the method of stabilization according to the main embodiment of the invention.

Said circuits provide a correction vector and a correction angle according to the above-described method, i.e. a stabilized small-format sequence 23. This stabilized small-format sequence 23 is fed to an up-sampling circuit 24, which multiplies the coordinates of the corrected vector by the same factor k as the one used during the down-sampling process (circuit 21). As a result, a stabilized wide-format sequence 25 is obtained for any further use.

This embodiment can thus allow a stabilization system to be scalable in terms of memory needs and power consumption.

As already recalled, if the stabilization method is capable of handling the memory needs to stabilize a CIF-format sequence for example, but cannot perform it because there is too much processing otherwise going on the device, or because the battery level of the device is too low, it can automatically switch to a processing where the sequence is down-sampled and a less computer intensive algorithm is used. As a matter of fact, such an algorithm processes a smaller amount of data.

Within sight of preceding description, it is clear that the invention achieves well its goals. The method brings many advantages, among which, it allows a very low-cost and reliable solution, while remaining simple of implementation.

The DIS method in accordance with the invention is particularly interesting when applied to low/mid-end digital video cameras, but it can be built in a mobile phone or a Key-ring, to provide a low-cost video stabilization application, that correct rotational jitter. It is also useful for coding video purposes, as rotational-compensated sequence will heavily minimize the residual to be encoded, thus improving the resulting image quality provided to the end-user.

It is to be understood that the present invention is not limited to the aforementioned embodiments and variations expressly described, and modifications may be made without departing from the spirit and scope of the invention. There are numerous ways of implementing functions of the method according to the invention by means of items of hardware or software, or both, provided that a single item of hardware or software can carry out several functions. It does not exclude that an assembly of items of hardware or software or both carry out a function, thus forming a single function without modifying the DIS method in accordance with the invention. Said hardware or software items can be implemented in several manners, such as by means of wired electronic circuits or by means of an integrated circuit that is suitable programmed respectively.

The invention claimed is:

1. A method for digital image stabilization for removing unwanted movements of a camera, in translation and/or rotation, called jitter, from a raw sequence of images generated by said camera and obtaining a stabilized sequence of images, the method comprising the following steps:
a first step of estimation of global motion of said camera, comprising sub-steps of calculating block motion vectors for predetermined parts of said images, determining macro-blocks for each of said parts and matching said macro-blocks of a current image with the ones of a previous image, and deriving from said block motion vectors of a translation vector and a rotation angle vector representing the motion of said camera and 1-bit binary images are generated and divided in a predetermined number of areas and in order to simplify the number of candidate vector in each of said areas, an extended search area is only performed on the first motion vector for a line of said macro-blocks and a reduced search area is performed on the remaining macro-blocks, said reduced area being centered around a predictor motion vector taken from a preceding reliable block motion vector, each area comprising a predetermined number of said macro-blocks and computing a reliability measure for each of said macro-blocks by counting the number of pixel of images at a "1" logic level, and in that said macro-blocks having a too high or too low predetermined ratio of "1" logic levels compared to "0" logic levels are labeled as unreliable, no motion estimation being then performed on said unreliable macro-blocks;
a second step of filtering and extracting said jitter by separating intentional motion from the unintentional one, comprising the sub-steps of translation vector filtering and rotational angle filtering; and
a third step of jitter compensation, consisting in compensating said raw sequence of images according to said extracted jitter, in order to obtain said stabilized sequence of images.

2. A method as claimed in claim 1, characterized in that the method further comprises a sub-step consisting in the rejection of probably unreliable motion vectors for which the so-called Sum of Absolute Difference, or "SAD", is above a predetermined threshold, said "SAD" being calculated by using binary images.

3. A method as claimed in claim 2, characterized in that, in order to speed said block matching, the method further comprise a sub-step in which, for each search position in said macro-blocks, a current "SAD" is compared to a current minimum "SAD" every two lines in said macro-blocks, followed by determining if said current "SAD" is already above said minimum, and stopping said search for this position if the result is true.

4. A method as claimed in claim 3, characterized in that the method comprises a sub-step of pruning of said block motion vectors, said pruning consisting in removing block motion vectors whose "SAD" is above a predetermined threshold, removing local outliers for each said search area and removing global outliers at the level of said images.

5. A method as claimed in claim 4, characterized in that said removing of local and global outliers consists in:
for each said search area and each said block motion vector k in said area, with $0 \leq k \leq$ number of valid block motion vectors, calculating the sum of absolute differences from said vector to all the remaining ones in said area, noted sum_diff[k];
calculating the average of said sum of absolute differences over said area, noted sum_diff[k] $=\Sigma_i$ abs(value[k]-value[i]), where average_diff is the average of the sum of absolute differences over said area;
determining the rejection criteria to be:
sum_diff_[k] >(number_of valid_vectors / a) +β* average_diff, α and β being predetermined thresholds; and
if any vector coordinates verifies the above relation, rejecting said vector.

6. A method as claimed in claim 5, characterized in that the method comprises, in order to calculate said translation vector and rotation angle, the sub-steps of:
defining a system of equations with six parameters a, b, c, d, e, and f, and resolving said system by use of mean square solution, the system being as follows:

$X=ax+by+e$ $Y=cx+dy+f$ x and y being coordinates of said binary images;
modelling a transformation of said system of equations as a translation vector whose coordinates are Tx and Ty, a rotation angle θ and a zoom scaling factor r of said camera for which the following equations are satisfied:

$X=r \cos \theta x - r \sin \theta y + Tx$ $Y=r \sin \theta x + r \cos \theta y + Ty;$ performing a check consisting in determining if the equality $a^2+b^2=c^2+d^2$ is approximately satisfied, in order to assert the consistency of coefficients a, b, c and d;
rejecting results if $(a^2+b^2)-(c^2+d^2)$>max_diff_zoom_factor, max_diff_zoom_factor being a predetermined maximum value of said zoom scaling factor r;

rejecting results if $|\theta_1-\theta_2|>$max_angle_difference, where max_angle_difference is a predetermined rotation angle parameter, $\theta_1$=arctan(-b/a) and $\theta_2$=arctan(c/d);

determining if a further predetermined rotation angle parameter, noted medium_angle_difference, matches the following equation: medium_angle_difference $<|\theta_1-\theta_2|<$max_angle_difference, and selecting the smallest of rotation angle found as a value of said rotation angle $\theta$;

if said results are considered consistent, setting said coordinates of translation vector to Tx=c and Tx=f, said rotation angle $\theta$ to be $\theta=(\theta_1+\theta_2)/2$; and otherwise, forcing said rotation angle $\theta$ to 0 and taking a value for said translation vector equal to a median value of said block motion vectors after said sub-step of outlier removal.

7. A method according to claim 6, characterized in that said rotation angle filtering performed during said second step consists in accumulating angles given by said motion estimation over a sequence of said images and trying to compensate them, said accumulated angles being calculated by summing all rotation angles over said sequence.

8. A method according to claim 7, characterized in that the method comprises further sub-step consisting in a bound checking in order to determine if the rotation and translation correction values to be performed are not above a predetermined allowed threshold, said threshold corresponding to an extra input area authorized in said images, and if said determination is true, said values are further corrected in order to stay within said authorized extra input area.

9. A method according to claim 1, characterized in that the method comprises a first supplementary step consisting in a down-sampling of said raw sequence of image, called original wide-format sequence of images, using a predetermined down-sampling factor, in order to obtain original small-format sequence of images, performing the three said steps of digital image stabilization on said small-format sequence of images, in order to obtain a stabilized small-format sequence of images, and a second supplementary step consisting in an up-sampling of said small-format sequence of images, using an up-sampling factor equal to said down-sampling factor, in order to obtain a stabilized wide-format sequence of images.

10. A method according to claim 9, characterized in that said first supplementary step of down-sampling is performed using a bilinear interpolator.

11. A method according to claim 9, characterized in that said method comprises a third supplementary step consisting in checking predetermined conditions and, if and only if said conditions are satisfied, automatically performing said down-sampling supplementary step.

12. A method according to claim 11, characterized in that the method being implemented in a system with limited computer resources, said checking step consists in determining if said resource are sufficient, and if the result is not true, in performing said down-sampling supplementary step.

13. A method according to claim 11, characterized in that the method being implemented in a system powered with batteries, said checking step consists in determining if the level of said batteries is too low, and if the result is true, in performing said down-sampling supplementary step.

* * * * *